Patented Jan. 1, 1952

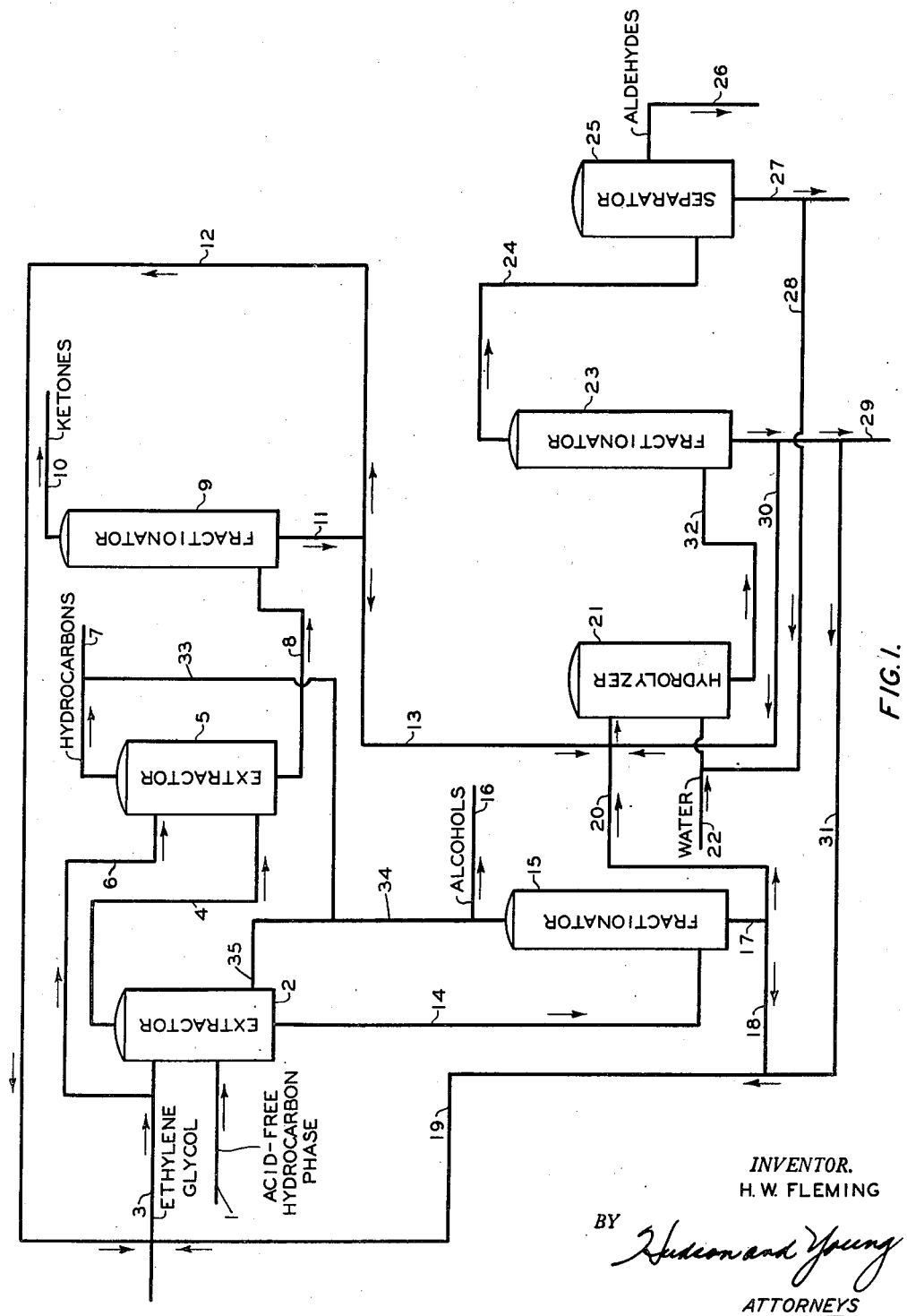

2,580,750

UNITED STATES PATENT OFFICE 2,580,750

SOLVENT EXTRACTION OF OXYGENATED ORGANIC COMPOUNDS

Harold W. Fleming, Bartlesville, Okla., assignor to Phillips Petroleum Company, a corporation of Delaware Application May 9, 1949, Serial No. 92,192

6 Claims. (Cl. 260—450)

This invention relates to the extraction of oxygenated organic compounds from normally liquid hydrocarbons. In a specific aspect this invention relates to the solvent extraction, using ethylene glycol as a solvent, of oxygenated organic compounds from the hydrocarbon phase resulting from the catalytic hydrogenation of a carbon oxide. In one embodiment, this invention relates to the solvent extraction, using ethylene glycol as a solvent, of oxygenated organic compounds from the hydrocarbon phase resulting from the hydrogenation of carbon monoxide in the presence of a fluidized iron catalyst.

The synthesis reaction between hydrogen and carbon monoxide for the production of hydrocarbons is well known. The reaction is effected in the presence of a catalyst, and for the reaction iron-, cobalt-, and nickel-containing catalysts have been found to be suitable. The iron-containing catalyst is the preferred type for the reaction, and it is usually used in a finely-divided, fluidized form and promoted with various oxides, such as the oxides of aluminum, calcium, potassium, silicon, and the like. With the preferred type of catalyst the reaction is preferably effected with a molar ratio of hydrogen to carbon monoxide of 1:1 to 3:1, at a temperature within the range of 295 to 320° C. and at an elevated pressure. These conditions are not critical, and reaction conditions outside these specified ranges may be used.

The products resulting from the reaction are dependent upon the catalyst and the reaction conditions. The reaction is usually effected at conditions suitable for the production of normally liquid hydrocarbons, but oxygenated organic compounds and water are also products of the reaction along with low-boiling hydrocarbons, carbon dioxide and high-boiling, waxy hydrocarbons. The normally liquid product readily separates into a hydrocarbon phase and an aqueous phase with oxygenated organic compounds distributed throughout both phases. Each phase may contain from 5 to 20 volume per cent of oxygenated organic compounds, and the recovery of these oxygenated compounds presents a complex problem.

The hydrocarbon phase contains organic alcohols, aldehydes, acids and ketones of varying molecular weights and boiling points. Ethylene glycol has been used as a solvent for the extraction of these oxygenated compounds from the hydrocarbon phase because it has a high selectivity for the oxygenated compounds and a low solubility in the hydrocarbons. In actual solvent extraction operation it has been found that ethylene glycol has several disadvantages. Ethylene glycol reacts readily with organic acids in the hydrocarbon phase to form esters and with aldehydes in the hydrocarbon phase to form acetals and hemiacetals. These reaction products are relatively high-boiling, and, when the ethylene glycol solvent is stripped of extracted oxygenated compounds, these reaction products are difficult to remove. Consequently, the solvent builds up an appreciable content of esters and acetals which lower the selectivity of the solvent for the oxygenated compounds. Also, the acetals and esters of the ethylene glycol become distributed in both the hydrocarbon and solvent phases, and, consequently, a portion of the ethylene glycol becomes lost in the hydrocarbon phase.

It is an object of this invention to provide a novel method for the extraction of oxygenated organic compounds from normally liquid hydrocarbons.

It is another object of this invention to provide a novel method for the extraction with ethylene glycol of oxygenated organic compounds from the hydrocarbon phase resulting from the catalytic hydrogenation of a carbon oxide.

It is a further object of this invention to provide a novel process for separating oxygenated organic compounds from the hydrocarbon phase resulting from the hydrogenation of carbon monoxide in the presence of an iron catalyst by extraction with ethylene glycol.

It is a further object of this invention to provide a process for separating oxygenated organic compounds from hydrocarbons by solvent extraction with ethylene glycol which overcomes difficulties encountered by the prior art.

Further and additional objects of my invention will be readily apparent from my disclosure hereinbelow.

I have found that oxygenated organic compounds can be separated from hydrocarbons by solvent extraction with ethylene glycol by making advantageous use of the reactivity of ethylene glycol with the aldehydes. I also make advantageous use of this reactivity and the selectivity of ethylene glycol for other oxygenated organic compounds in preference to ketones.

The accompanying drawing, Fig. 1, is a schematic flow diagram of one method for effecting my process. Such conventional equipment as pumps, valves, compressors, and the like have not been included in the drawing, but it is believed that their inclusion is obvious to one skilled in the art.

In accordance with my process a mixture of hydrocarbons and oxygenated organic compounds is treated, as described hereinbelow, to recover the hydrocarbons and the oxygenated organic compounds. Although my process may be used to resolve mixtures of normally liquid hydrocarbons and oxygenated organic compounds obtained from any suitable source, I prefer to use my process to resolve a normally liquid hydrocarbon phase that is derived from the catalytic hydrogenation of carbon monoxide. This phase is obtained by condensing the effluent from the hydrogenation reaction and recovering the normally liquid reaction product. The condensed normally liquid product separates into an aqueous phase and a hydrocarbon phase with both phases containing admixed oxygenated organic compounds. I recover the hydrocarbon phase from the condensed product, and it is upon this hydrocarbon phase that my invention may be practiced. Alternatively, preferred fractions may be separated from the total liquid hydrocarbon phase for the practice of my invention. When using a fluidized iron catalyst, a preferred fraction of the hydrocarbon phase boils from 15 to 160° C. Another preferred fraction boils from 80 to 190° C.

In my process I remove the organic acids from the hydrocarbon phase to be resolved by conventional means to prevent the formation of high-boiling esters when the ethylene glycol is subsequently introduced to the process. A suitable method for removing the organic acids is by caustic wash, such as with a sodium hydroxide solution. To the acid-free hydrocarbon phase is then added ethylene glycol to extract the alcohols and aldehydes. This first ethylene glycol extraction step is effected with volumetric ratios of ethylene glycol to acid-free hydrocarbon phase within the range of 0.5:1 to 1.5:1, preferably less than 1:1. The temperature is preferably not above 100° C since higher temperatures promote polymerization of the aldehydes and condensation or dehydration of the ethylene glycol. Normal, atmospheric pressures are preferable, but superatmospheric pressures may be used. The pressure should not exceed that pressure required to prevent vaporization of the hydrocarbons in the hydrocarbon phase. Under these conditions the ethylene glycol selectively extracts the alcohols and aldehydes from the hydrocarbon phase. A relatively minor amount of the ketones may also be extracted, but most of the ketones remain in the hydrocarbon phase. The extracted aldehydes react with ethylene glycol to form acetals which are higher boiling than the extracted alcohols, and the alcohols are readily separated from the solvent extract phase by simple distillation. The acetals in the ethylene glycol are then hydrolyzed by the addition of water in a volumetric ratio of water to alcohol-free extract phase of 0.5:1 to 1:1 and by heating to a temperature within the range of 100 to 150° C. By this hydrolysis the acetals are resolved to reform the aldehydes which may be recovered from the ethylene glycol solvent by distillation.

The hydrocarbon phase from which organic acids, alcohols and aldehydes have been removed is subjected to a second extraction step with ethylene glycol to separate the ketones therefrom. In this second extraction a volumetric ratio of ethylene glycol to hydrocarbon phase, or raffinate from the first extraction step, higher than the ratio used in the first extraction step and within the range of 1:1 to 4:1 is used. The temperature and pressure are within the limits set forth above for the first extraction step, and at these conditions ethylene glycol extracts the organic ketones from the organic phase. The resulting products from this extraction are hydrocarbons from which the organic oxygenated compounds have been removed, and ethylene glycol containing extracted ketones. By distillation the ketones are recovered from the extract phase, and uncontaminated ethylene glycol is recycled to the extraction steps described hereinabove.

My process utilizes the advantageous characteristics of ethylene glycol in extraction of oxygenated organic compounds from hydrocarbons, i. e., high selectivity for the oxygenated organic compounds and low solubility in the hydrocarbons. Additionally, these desirable characteristics of the solvent are maintained at a high level at all times since no deleterious impurities, such as esters and acetals, are allowed to concentrate in the solvent. Further, my process capitalizes on the reactivity of the solvent with aldehydes and utilizes this normally undesirable characteristic to aid in and to simplify the separation of the extracted oxygenated organic compounds.

In the accompanying drawing, shown in Figure 1, the preliminary steps, such as the catalytic hydrogenation of carbon monoxide, condensation of reaction products, separation of aqueous and hydrocarbon phases, fractionation of the product to obtain desired fractions, removal of organic acids by caustic wash, etc., have not been included in the drawing in order that the drawing and the process will be readily understood, but the inclusion of these steps is well within the scope of my invention. Referring to Figure 1, the feed to the process is a hydrocarbon phase resulting from the hydrogenation of carbon monoxide in the presence of an iron catalyst and containing normally liquid hydrocarbons, organic alcohols, aldehydes and ketones. The feed enters the system via line 1 and is fed into extractor 2. Ethylene glycol enters extractor 2 via line 3 in a volumetric ratio of glycol to hydrocarbon phase of 0.75:1. The temperature in extractor 2 is 30° C. and the pressure is atmospheric. The ethylene glycol contacts the hydrocarbon phase countercurrently and extracts the alcohols and aldehydes. The raffinate from extractor 2 passes via line 4 to extractor 5 where it is subjected to countercurrent solvent extraction with ethylene glycol entering via line 6. The volumetric ratio of ethylene glycol to the feed to extractor 5 entering via line 4 is 2:1. The temperature and pressure in extractor 5 are similar to those in extractor 2. Hydrocarbons free of organic oxygenated compounds are withdrawn from the system via line 7. The extract phase from the second extraction step containing ethylene glycol and ketones passes via line 8 to fractionator 9 wherein the extract phase is fractionated to obtain the ketones overhead via line 10 and the ethylene glycol as the bottoms product. The ethylene glycol is withdrawn via line 11 and recycled to the solvent extraction steps described supra via line 12. Since the ethylene glycol may contain some acetals, a portion of the bottoms product may be passed to a hydrolysis step (to be described infra) via line 13.

The extract phase from extractor 2, containing ethylene glycol, alcohols and aldehydes in the form of acetals, passes via line 14 to fractionator 15 from which the alcohols are withdrawn as overhead via line 16. If desired, part of the alcohols may be returned to extractor 2 to enrich the ethylene glycol and to aid in causing all the ketones to be withdrawn in the hydrocarbon phase via line 4. If some acetals distill over with the alcohols and cannot be separated by fractionation, the overhead fraction may be hydrolyzed with water at about 100° C. The alcohols and aldehydes are then fractionated in the presence of water. The aldehyde-water azeotropes from such a mixture are lower boiling than the alcohol-water azeotropes, and thus the aldehydes and alcohols are readily separable. The bottoms product from fractionator 15 is withdrawn via line 17. If the feed entering the system via line 1 contains only a small amount of aldehydes, the bottoms product from fractionator 15 will contain only a small amount of acetals, and the bottoms product which is essentially ethylene glycol may be recycled to the extraction steps described supra via lines 18 and 19. To obtain the aldehydes the bottoms product from fractionator 15 passes via lines 17 and 20 to hydrolyzer 21, and water is introduced to hydrolyzer 21 via line 22 in a volumetric ratio of water to bottoms product from fractionator 15 of 0.75 to 1. In hydrolyzer 21 the acetals are hydrolyzed and thus resolved to form aldehydes and ethylene glycol at 100° C. Water, aldehydes and ethylene glycol pass via line 32 to fractionator 23, and the water and aldehydes are taken overhead via line 24 to separator 25. The aldehydes are withdrawn via line 26, and the water may be either withdrawn from the system via line 27 or recycled to hydrolyzer 21 via line 28. The bottoms product from fractionator 23 contains essentially ethylene glycol, and it may be withdrawn from the system via line 29. Alternatively, if the bottoms product contains some acetals, the bottoms product or a portion thereof may be recycled to hydrolyzer 21 via line 30. Also, the ethylene glycol bottoms product may be recycled to the solvent extraction steps, infra, via lines 31 and 19.

The ketones that are introduced to my process in the hydrocarbon phase via line 1 are within a rather wide molecular weight range, and the low molecular weight ketones are appreciably soluble in ethylene glycol. To remove the low molecular weight ketones in the raffinate of the first extraction step, I reflux to extractor 2 a portion of the hydrocarbon passing in line 7 via lines 33 and 35 and a portion of the alcohols passing in line 16 via lines 34 and 35. Ethylene glycol is more selective for the recycled alcohols than the ketones, and ketones in the ethylene glycol solution are thus separated therefrom. The recycled hydrocarbons aid in removing the thus-separated ketones in the raffinate via line 4.

*Example*

A mixture of n-heptane, n-butanol and 2-ethyl butyraldehyde consisting of 800 grams of n-heptane, 100 grams of n-butanol and 100 grams of 2-ethyl butyraldehyde was extracted with 1000 grams of ethylene glycol.

| | Refractive Index | Boiling Point, °C. |
|---|---|---|
| n-heptane | 1.3879 | 98.5 |
| n-butanol | 1.3991 | 118 |
| 2-ethyl butyraldehyde | 1.4019 | 118 |
| ethylene glycol | 1.4318 | 197 |

Analysis indicated that greater than seventy per cent of the alcohol was extracted in a single extraction stage while approximately forty per cent of the aldehyde was extracted.

An aliquot of the glycol extract was charged to a fractionating column and fractionated to yield a small fraction consisting of hydrocarbon and water with a possible trace of butanol. This product consisted of an upper and lower layer with the refractive indexes being 1.3881 and 1.34 respectively. After recovery of approximately 20 ml. of the above mixture the column lined out on a plateau of substantially pure butanol (refractive index 1.3987, density at 20°, 0.8148, volume 75 ml.). On leaving the butanol plateau the temperature increased sharply to approximately 154° C. with a corresponding increase in refractive index of the product which started coming over in two phases. The refractive index of the upper phase was 1.427 while that of the lower phase was 1.425.

Since the 2-ethyl butyraldehyde, boiling point 118° C., had not been recovered it was concluded from this experiment that the glycol and aldehyde were reacting to form a complex addition product. To test this a mixture was made up of 81 grams of 2-ethyl butyraldehyde and 564 grams of ethylene glycol and the mixture was fractionated. The first fractions collected overhead consisted of 2-ethyl-butyraldehyde and water. When approximately 10 grams of aldehyde and slightly more than 13 grams of water had been recovered overhead, the temperature increased sharply to 152° C. and a mixture consisting of a complex addition product and glycol started coming over. The probable addition reaction and products are:

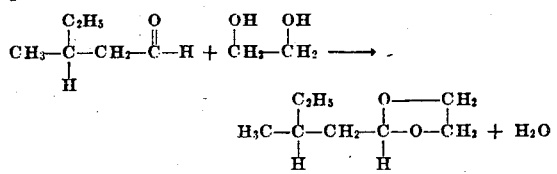

This mixture was recovered as two phases at 20° C. The refractive index of the upper phase was 1.425-1.427 while that of the lower phase was 1.428-1.429.

In order to hydrolyze the complex that remained in the kettle the heat input was stopped and water was added to the kettle through the column head. During a forty-five minute period the kettle temperature fell from 166° C. to 124° C. At this point the heat was turned on and the aldehyde was distilled from the glycol with excess water. Substantially pure aldehyde and water were collected overhead as two phases with the refractive indices being 1.4019 and 1.3331 respectively.

Throughout my disclosure I have discussed particularly the application of my invention to the separation of oxygenated organic compounds from the hydrocarbon phase resulting from the hydrogenation of carbon monoxide. My invention is not limited to that source for the feed for my process, and my invention may be practiced upon other mixtures of normally liquid hydrocarbons and oxygenated organic compounds. Also, my process is subject to wide variations which are within the scope of my invention. For example, if the mixture to be resolved contains no ketones, then the second solvent extraction step can be eliminated from my process, and substantially pure hydrocarbons are obtained in the raffinate from the first ethylene glycol extraction step. Also, if the mixture contains no aldehydes, no acetals will be formed with the ethylene glycol, and the step for hydrolyzing acetals and the subsequent steps for separation of the hydrolysis products may be eliminated. Similarly, if the feed mixture contains no alcohols, the bottoms product from the first ethylene glycol extraction step may be passed directly to the step for hydrolysis of acetals without any fractionation for the separation of alcohols.

I have described my process hereinabove using ethylene glycol as the solvent. Ethylene glycol is preferred because of its availability and relatively low solubility, but other glycols and polyglycols may be used as the solvent in my process. For example, diethylene glycol, propylene glycol, the butylene glycols, and the like may also be employed. The glycol should preferably have no more than 4 carbon atoms in any one single grouping of carbon atoms.

Other variations of my process within the scope of the invention disclosed hereinabove will be readily apparent to those skilled in the art.

I claim:
1. The method of resolving a normally liquid hydrocarbon phase resulting from the hydrogenation of carbon monoxide in the presence of a fluidized iron catalyst and containing hydrocarbons, organic acids, alcohols, aldehydes and ketones which comprises removing organic acids from said mixture by contacting said mixture with an aqueous caustic solution, contacting the thus-produced organic acid-free mixture with ethylene glycol in a volumetric ratio of ethylene glycol to organic acid-free mixture within the range of 0.5:1 to 1.5:1 and at a temperature not above 100° C., separating a raffinate phase containing hydrocarbons and ketones, contacting said raffinate phase with additional ethylene glycol in a volumetric ratio of ethylene glycol to raffinate phase within the range of 1:1 to 4:1 and at a temperature not above 100° C., recovering a raffinate phase from said second ethylene glycol contacting step containing said hydrocarbons and an extract phase containing ethylene glycol and ketones, separating the ketones therefrom and recycling ethylene glycol to said ethylene glycol contacting steps described above, recovering from said first ethylene glycol contacting step an extract phase containing ethylene glycol, alcohols and acetals of ethylene glycol and aldehydes, separating alcohols from said extract phase, hydrolyzing acetals in the alcohol-free extract phase thus produced with a volumetric ratio of water to alcohol-free extract phase within the range of 0.5:1 to 1:1 and at a temperature of 100 to 150° C., separating from the resulting mixture a fraction containing ethylene glycol and a fraction containing aldehydes and water and recycling thus-separated ethylene glycol to the ethylene glycol contacting steps described above.

2. In a process wherein a liquid mixture containing a hydrocarbon and a normally hydrocarbon-soluble alcohol, aldehyde and ketone is solvent extracted with a liquid glycol to recover said alcohol, aldehyde and ketone therefrom, the improvement which comprises; contacting in a contacting zone said mixture with a liquid glycol containing no more than 4 carbon atoms in any one group of carbon atoms, in a volumetric ratio of said glycol to said mixture within the range 0.5:1–1.5:1; recovering as a raffinate from said contacting zone a liquid hydrocarbon phase containing said ketone and recovering as an extract from said contacting zone a liquid glycol phase containing said alcohol and said aldehyde, at least a portion of said aldehyde being recovered as an acetal of said glycol; separating ketone from said hydrocarbon phase by solvent extraction with additional glycol to produce a substantially ketone-free hydrocarbon; separating alcohol from said liquid glycol phase by distillation and recycling at least a portion of said ketone-free hydrocarbon and said separated alcohol to said contacting zone.

3. The process according to claim 2 wherein the liquid glycol is ethylene glycol.

4. In a process wherein a liquid mixture containing a hydrocarbon and a normally hydrocarbon soluble alcohol, aldehyde and ketone is solvent extracted with ethylene glycol to recover said alcohol, aldehyde and ketone therefrom, the improvement which comprises; contacting in a first contacting zone said mixture with ethylene glycol in a volumetric ratio of ethylene glycol to said mixture within the range 0.5:1–1.5:1; recovering as a raffinate therefrom a liquid hydrocarbon phase containing said ketone and recovering as an extract therefrom an ethylene glycol phase containing said alcohol and said aldehyde, at least a portion of said aldehyde being recovered as an acetal of ethylene glycol; separating said ketone from said raffinate by contacting said raffinate with ethylene glycol in a second contacting zone in a volumetric ratio of ethylene glycol to raffinate higher than in said first contacting zone and within the range 1:1–4:1; separating alcohol from said extract by distillation; hydrolyzing the resulting alcohol-free extract to convert any acetal therein to the corresponding aldehyde and ethylene glycol; recovering aldehyde resulting from said hydrolysis step; recovering ketone-free hydrocarbon from said second contacting zone and recycling a portion of said ketone-free hydrocarbon and a portion of said separated alcohol to said first contacting zone.

5. The process according to claim 4 wherein the glycol is ethylene glycol.

6. The process according to claim 4 wherein the acetal is hydrolyzed with a volumetric ratio of water to alcohol-free extract within the range 0.5:1–1:1.

HAROLD W. FLEMING.

REFERENCES CITED

The following references are of record in the file of this patent:

UNITED STATES PATENTS

| Number | Name | Date |
|---|---|---|
| 2,307,937 | Marvel | Jan. 12, 1943 |
| 2,452,121 | Grahame | Oct. 26, 1948 |

OTHER REFERENCES

U. S. Naval Technical Mission in Europe, "The Synthesis of Hydrocarbons and Chemicals from CO and $H_2$." OTS, vol. 2, No. 5, August 2, 1946, page 89.